United States Patent
Ali et al.

(10) Patent No.: US 7,634,766 B2
(45) Date of Patent: *Dec. 15, 2009

(54) METHOD AND APPARATUS FOR PATTERN-BASED SYSTEM DESIGN ANALYSIS USING A META MODEL

(75) Inventors: Syed M. Ali, Menlo Park, CA (US); Yury Kamen, Menlo Park, CA (US); Deepak Alur, Santa Clara, CA (US); John P. Crupi, Bethesda, MD (US); Daniel B. Malks, Arlington, VA (US); Michael W. Godfrey, Waterloo (CA)

(73) Assignee: Sun Microsystems, Inc., Santa Clara, CA (US)

( * ) Notice: Subject to any disclaimer, the term of this patent is extended or adjusted under 35 U.S.C. 154(b) by 887 days.

This patent is subject to a terminal disclaimer.

(21) Appl. No.: 11/134,021

(22) Filed: May 20, 2005

(65) Prior Publication Data

US 2006/0265699 A1    Nov. 23, 2006

(51) Int. Cl.
*G06F 9/45* (2006.01)
*G06F 9/44* (2006.01)
(52) U.S. Cl. .................... 717/141; 717/104; 707/3
(58) Field of Classification Search ......... 717/104–106, 717/108, 116, 120, 122, 141–143; 707/3
See application file for complete search history.

(56) References Cited

U.S. PATENT DOCUMENTS

| 5,649,200 | A | * | 7/1997 | Leblang et al. ............. 717/122 |
| 5,664,173 | A | * | 9/1997 | Fast ............................... 707/4 |
| 5,752,245 | A | * | 5/1998 | Parrish et al. ................. 707/10 |
| 5,812,840 | A |   | 9/1998 | Shwartz |
| 5,875,334 | A | * | 2/1999 | Chow et al. .................. 717/141 |
| 5,911,139 | A | * | 6/1999 | Jain et al. ....................... 707/3 |
| 6,023,694 | A | * | 2/2000 | Kouchi et al. .................. 707/2 |
| 6,199,195 | B1 | * | 3/2001 | Goodwin et al. ............ 717/104 |
| 6,366,922 | B1 | * | 4/2002 | Althoff .................... 707/103 R |
| 6,430,553 | B1 | * | 8/2002 | Ferret ............................. 707/3 |
| 6,446,256 | B1 | * | 9/2002 | Hyman et al. ............... 717/143 |

(Continued)

FOREIGN PATENT DOCUMENTS

GB    2 383 152 A    6/2003

OTHER PUBLICATIONS

Moon et al, "Managing and querying transaction time databses under scheme evolution", ACM PVLDB, pp. 882-895, 2008.*

(Continued)

*Primary Examiner*—Anil Khatri
(74) *Attorney, Agent, or Firm*—Osha • Liang LLP

(57) ABSTRACT

A method for analyzing a target system that includes obtaining a characteristics model, loading the characteristics model into a meta model, obtaining a plurality of characteristics from the target system using a characteristics extractor, wherein each of the plurality of characteristics is associated with the characteristics model, storing each of the plurality of characteristics obtained from the target system in a characteristics store, and analyzing the target system by issuing at least one query to the characteristics store to obtain an analysis result, wherein the issuing the at least one query comprises verifying the at least one query using the meta model.

16 Claims, 7 Drawing Sheets

U.S. PATENT DOCUMENTS

| | | | |
|---|---|---|---|
| 6,760,903 | B1 | 7/2004 | Morshed et al. |
| 7,100,152 | B1* | 8/2006 | Birum et al. ................. 717/131 |
| 7,137,100 | B2* | 11/2006 | Iborra et al. ................. 717/106 |
| 7,140,000 | B2* | 11/2006 | Yucel .......................... 717/104 |
| 7,243,337 | B1 | 7/2007 | Cowan |
| 7,248,971 | B1 | 7/2007 | Rigoutsos et al. |
| 7,289,997 | B1* | 10/2007 | Kita et al. ................... 707/100 |
| 7,337,170 | B2* | 2/2008 | Lee et al. ....................... 707/6 |
| 7,475,080 | B2* | 1/2009 | Chowdbary et al. ......... 707/100 |
| 7,530,050 | B2* | 5/2009 | Mohan et al. ................ 717/100 |
| 7,533,365 | B1* | 5/2009 | Hogstrom et al. ........... 717/105 |
| 7,571,434 | B1* | 8/2009 | Kamen et al. ................ 717/154 |
| 2001/0042067 | A1 | 11/2001 | Dayani-Fard et al. |
| 2003/0200280 | A1 | 10/2003 | Austin |
| 2004/0059812 | A1 | 3/2004 | Assa |
| 2004/0093344 | A1 | 5/2004 | Berger et al. |
| 2004/0255291 | A1 | 12/2004 | Sierer et al. |
| 2005/0044060 | A1 | 2/2005 | Wu et al. |
| 2005/0044197 | A1 | 2/2005 | Lai |
| 2005/0198616 | A1 | 9/2005 | Uehara et al. |
| 2006/0124738 | A1 | 6/2006 | Wang et al. |
| 2006/0265698 | A1 | 11/2006 | Kamen et al. |

OTHER PUBLICATIONS

Srivastava et al, "Intensional associations between data and metadata", ACM SIGMOD, pp. 401-412, 2007.*
Huang et al, "Adaptively constructing the query interface for meta search engines", ACM IUI, pp. 92-100, 2001.*
Bessam et al, "Software architecture between meta mode for real time systems", IEEE, pp. 245-252, 2008.*
International Preliminary Report dated Dec. 6, 2007 (8 pages).
International Preliminary Report dated Dec. 6, 2007 (7 pages).
PCT International Search Report dated Jan. 4, 2006 for PCT/US2005/018004 (4 pages).
PCT International Search Report dated Jan. 4, 2006 for PCT/US2005/018008 (4 pages).
PCT International Search Report dated Jan. 23, 2006 for PCT/US/2005/018003 (4 pages).
Sartipi, K. et al.; "A Pattern Matching Framework for Software Architecture Recovery and Restructuring"; Proceedings IWPC'00; 8$^{th}$ International Workshop on Program Comprehension, Jun. 10, 2000, pp. 1-11 (11 pages).
Lange, C. et al.; "Comparing Graph-based Program Comprehension Tools to Relational Database-based Tools"; Program Comprehension, 2001; IWPC 2001 Proceedings; 9$^{th}$ International Workshop on May 12-13, 2001, Piscataway, NJ; IEEE 2001; pp. 209-218 (10 pages).
Sartipi, K. et al.; "A Graph Pattern Matching Approach to Software Architecture Recovery"; Proceedings IEEE International Conference on Software Maintenance; ICSM-2001, Florence, Italy, Nov. 7-9, 2001; pp. 408-419 (12 pages).
Jarzabek, S.; "Design of Flexible Static Program Analyzers with PQL"; IEEE Transactions on Software Engineering, IEEE Service Center, vol. 24, No. 3, Mar. 1, 1998; pp. 197-215 (19 pages).
Paul, S. et al.; "Source Code Retrieval Using Program Patterns"; Computer-Aided Software Engineering, 1992, Proceedings, Fifth International Workshop, Montreal, Quebec, Canada, Jul. 6-10, 1992; IEEE Computer Science, Jul. 6, 1992; pp. 92-105 (11 pages).
Masiero, P. et al.; "Legacy Systems Reengineering Using Software Patterns"; Computer Science Society, 1999, Proceedings SCCC '99; XIX International Conference of the Chilean Talca, Chile, Nov. 11-13, 1999; IEEE Computer Science; pp. 160-169 (10 pages).
International Search Report dated Feb. 15, 2006 (3 pages).
Atkins, David L.; "Version Sensitive Editing: Change History as a Programming Tool"; System Configuration Management; ECOOP '98, SCM-8 Symposium, Proceedings 1998, Berlin, Germany; pp. 146-157, 1998 (12 pages).
Ellsworth et al; "JUnit+Jtest=Automated Test Case Design and Static Analysis"; May 9, 2003 (3 pages).
"J2EE Code Validation Preview for WebSphere Studio"; Mar. 21, 2005 (3 pages).
"SQL Compiler (for Java) Free your Java code from SQL statements-compile them to Java classes"; May 1, 2005 (9 pages).
Prof. Victor V. Martynov, EHU; "SEMPL Semantic Patterns Language"; Summary Chapter from the book "Foundations of Samantic Coding", pp. 128-138, EHU, 2001 (9 pages).
"Hammurapi Group"; pp. 1-7.
Kamran Sartipi; "Software Architecture Recovery Based on Pattern Matching"; School of Computer Science, University of Waterloo; Proceedings of the International Conference on Software Maintenance (ICSM'03); IEEE Computer Society (4 pages).
Aldrich, et al; "Architectural Reasoning in ArchJava"; Department of Computer Science and Engineering; University of Washington; 2002; pp. 1-34.
"Structural Analysis of Java"; Mar. 1, 2004 (2 pages).
Lovatt, et al.; "A Pattern Enforcing Compiler (PEC) for Java: Using the Compiler"; Department of Computing, Macquarie University; 2005 Australian Computer Society, Inc.; (10 pages).
Hallem, et al.; "Uprooting Software Defects at the Source"; Instant Messaging, vol. 1, No. 8, Nov. 2003; pp. 1-9.
"Fixing Software on the Assembly Line" An Overview of Coverity's Static Code Analysis Technology; (26 pages).
"CAST Application Intelligence Platform Empowering Application Management"; CAST The Application Intelligence Company; Oct. 2004 (2 pages).
Agitar Data Sheet; "Agitator & Management Dashboard"; Agitar Software 2003-2005; (4 pages).
Ellsworth et al; "JUnit+Jtest=Automated Test Case Design and Static Analysis"; (3 pages).
Carriere et al.; "Assessing Design Quality From a Software Architectural Perspective"; OOPSLA '97 Workshop on Object-Oriented Design Quality; Oct. 5, 1997 (4 pages).
"J2EE Code Validation Preview for WebSphere Studio"; (2 pages).
"SQL Compiler (for Java)"; (8 pages).
Hassan et al.; "Architecture Recovery of Web Applications"; The Guide to Computing Literature; International Conference on Software Engineering; 2002; (12 pages).

* cited by examiner

METHOD AND APPARATUS FOR PATTERN-BASED SYSTEM DESIGN ANALYSIS USING A META MODEL

CROSS-REFERENCE TO RELATED APPLICATIONS

The present application contains subject matter that may be related to the subject matter in the following U.S. applications filed on May 20, 2005, and assigned to the assignee of the present application: "Method and Apparatus for Tracking Changes in a System" Ser. No. 11/133,831; "Method and Apparatus for Transparent Invocation of a Characteristics Extractor for Pattern-Based System Design Analysis" Ser. No. 11/134,154; "Method and Apparatus for Generating Components for Pattern-Based System Design Analysis Using a Characteristics Model" Ser. No. 11/133,717; "Method and Apparatus for Pattern-Based System Design Analysis" Ser. No. 11/134,062; "Method and Apparatus for Cross-Domain Querying in Pattern-Based System Design Analysis" Ser. No. 11/133,507; "Pattern Query Language" Ser. No. 11/133,660; and "Method and Apparatus for Generating a Characteristics Model for Pattern-Based System Design Analysis Using a Schema" Ser. No. 11/133,714.

BACKGROUND

As software technology has evolved, new programming languages and increased programming language functionality has been provided. The resulting software developed using this evolving software technology has become more complex. The ability to manage the quality of software applications (including design quality and architecture quality) is becoming increasingly more difficult as a direct result of the increasingly complex software. In an effort to manage the quality of software applications, several software development tools and approaches are now available to aid software developers in managing software application quality. The following is a summary of some of the types of quality management tools currently available.

One common type of quality management tool is used to analyze the source code of the software application to identify errors (or potential errors) in the source code. This type of quality management tool typically includes functionality to parse the source code written in a specific programming language (e.g., Java™, C++, etc.) to determine whether the source code satisfies one or more coding rules (i.e., rules that define how source code in the particular language should be written). Some quality management tools of the aforementioned type have been augmented to also identify various coding constructs that may result in security or reliability issues. While the aforementioned type of quality management tools corrects coding errors, it does not provide the software developer with any functionality to verify the quality of the architecture of software application.

Other quality management tools of the aforementioned type have been augmented to verify that software patterns have been properly implemented. Specifically, some quality management tools of the aforementioned type have been augmented to allow the software developer to indicate, in the source code, the type of software pattern the developer is using. Then the quality management tool verifies, during compile time, that the software pattern was used/implemented correctly.

In another implementation of the aforementioned type of quality management tools, the source code of the software is parsed and the components (e.g., classes, interfaces, etc.) extracted from the parsing are subsequently combined in a relational graph (i.e., a graph linking all (or sub-sets) of the components). In a subsequent step, the software developer generates an architectural design, and then compares the architectural design to the relational graph to determine whether the software application conforms to the architectural pattern. While the aforementioned type of quality management tool enables the software developer to view the relationships present in the software application, it does not provide the software developer with any functionality to conduct independent analysis on the extracted components.

Another common type of quality management tool includes functionality to extract facts (i.e., relationships between components (classes, interfaces, etc.) in the software) and subsequently displays the extracted facts to the software developer. While the aforementioned type of quality management tool enables the software developer to view the relationships present in the software application, it does not provide the developer with any functionality to independently query the facts or any functionality to extract information other than facts from the software application.

Another common type of quality management tool includes functionality to extract and display various statistics (e.g., number of lines of code, new artifacts added, software packages present, etc.) of the software application to the software developer. While the aforementioned type of quality management tool enables the software developer to view the current state of the software application, it does not provide the developer with any functionality to verify the quality of the architecture of the software application.

SUMMARY

In general, in one aspect, the invention relates to a A method for analyzing a target system, comprising obtaining a characteristics model, loading the characteristics model into a meta model, obtaining a plurality of characteristics from the target system using a characteristics extractor, wherein each of the plurality of characteristics is associated with the characteristics model, storing each of the plurality of characteristics obtained from the target system in a characteristics store, and analyzing the target system by issuing at least one query to the characteristics store to obtain an analysis result, wherein the issuing the at least one query comprises verifying the at least one query using the meta model.

In general, in one aspect, the invention relates to a system for analyzing a target system, comprising a meta model configured to extract and store information about a characteristics model, the target system comprising a plurality of characteristics, at least one characteristics extractor configured to obtain at least one of the plurality of characteristics from the target system, wherein the at least one of the plurality of characteristics is defined in the characteristics model, a characteristics store configured to store the at least one of the plurality of characteristics obtained from the target system, and a query engine configured to analyze the target system by issuing at least one query to the characteristics store and configured to obtain an analysis result in response to the at least one query, wherein the issuing the at least one query comprises verifying the at least one query using the meta model.

In general, in one aspect, the invention relates to a computer readable medium comprising software instructions for analyzing a target system, the software instructions executable on a computer to obtain a characteristics model, load the characteristics model into a meta model, obtain a plurality of characteristics from the target system using a characteristics extractor, wherein each of the plurality of characteristics is associated with the characteristics model, store each of the plurality of characteristics obtained from the target system in a characteristics store, and analyze the target system by issuing at least one query to the characteristics store to obtain an analysis result, wherein the issuing the at least one query comprises verifying the at least one query using the meta model.

Other aspects of the invention will be apparent from the following description and the appended claims.

DETAILED DESCRIPTION

Figure 1:
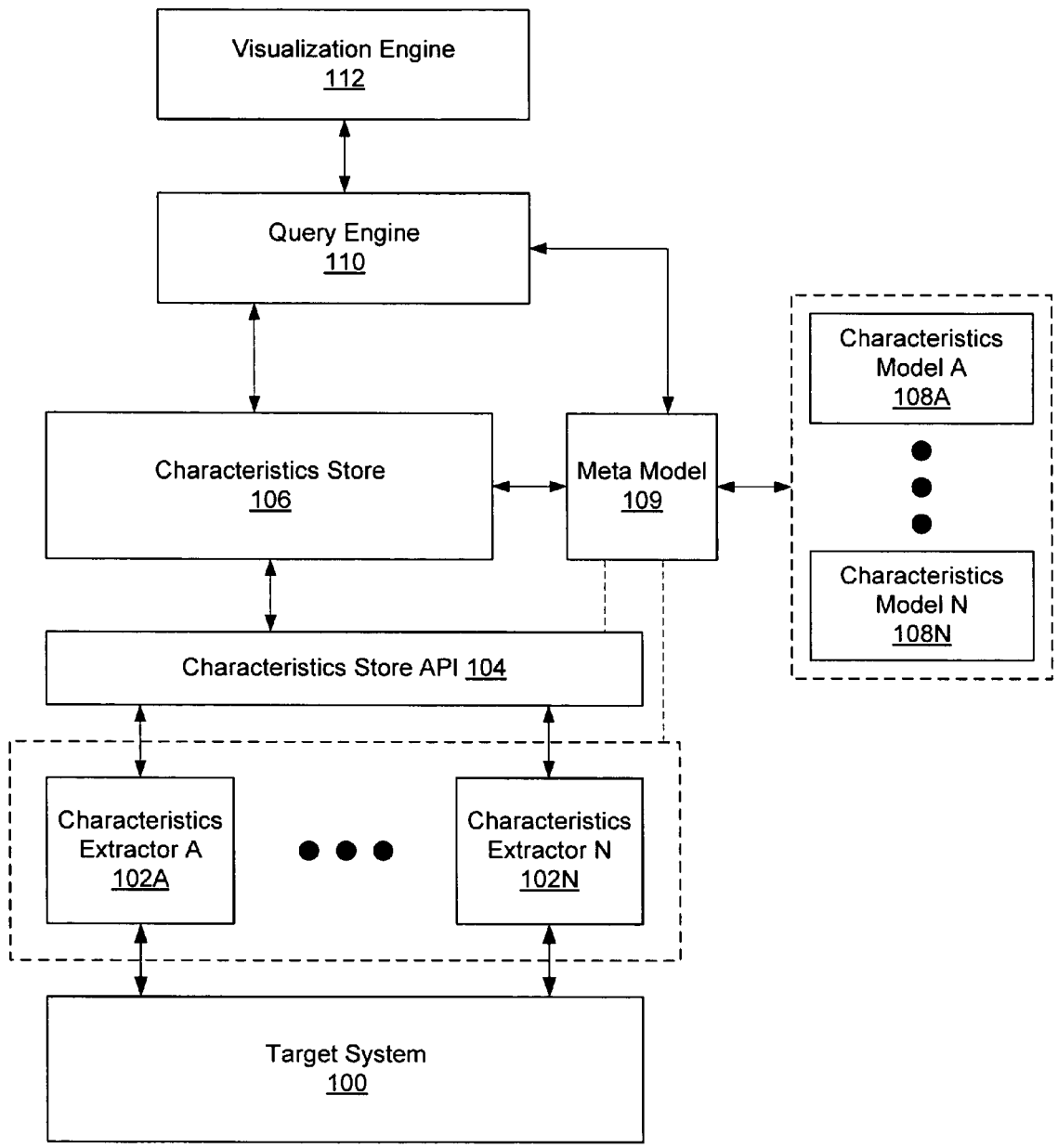
FIG. 1 shows a system in accordance with one embodiment of the invention.

Exemplary embodiments of the invention will be described with reference to the accompanying drawings. Like items in the drawings are shown with the same reference numbers.

In the exemplary embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for pattern-based system design analysis. More specifically, embodiments of the invention provide a method and apparatus for using one or more characteristics models, one or more characteristics extractors, a query engine configured to query the characteristics of a target system to analyze the system design, and a meta model configured to load the one or more characteristics models and configured to verify queries used to analyze the characteristics of the target system. Embodiments of the invention provide the software developer with a fully configurable software quality management tool that enables the software developer to extract information about the characteristics of the various artifacts in the target system, and then issue queries to determine specific details about the various artifacts including, but not limited to, information such as: number of artifacts of the specific type present in the target system, relationships between the various artifacts in the target system, the interaction of the various artifacts within the target system, the software patterns that are used within the target system, etc.

FIG. 1 shows a system in accordance with one embodiment of the invention. The system includes a target system (100) (i.e., the system that is to be analyzed) and a number of components used in the analysis of the target system. In one embodiment of the invention, the target system (100) may correspond to a system that includes software, hardware, or a combination of software and hardware. More specifically, embodiments of the invention enable a user to analyze specific portions of a system or the entire system. Further, embodiments of the invention enable a user to analyze the target system with respect to a specific domain (discussed below). Accordingly, the target system (100) may correspond to any system under analysis where the system may correspond to the entire system including software and hardware, or only a portion of the system (e.g., only the hardware portion, only the software portion, a sub-set of the hardware or software portion, or any combination thereof).

As shown in FIG. 1, the system includes the following components to aid in the analysis of the target system: one or more characteristics extractors (e.g., characteristics extractor A (102A), characteristics extractor N (102N)), a characteristics store application programming interface (API) (104), a characteristics store (106), one or more characteristics models (108A, 108N), a meta model (109), a query engine (110), and visualization engine (112). Each of these components is described below.

Figure 3:
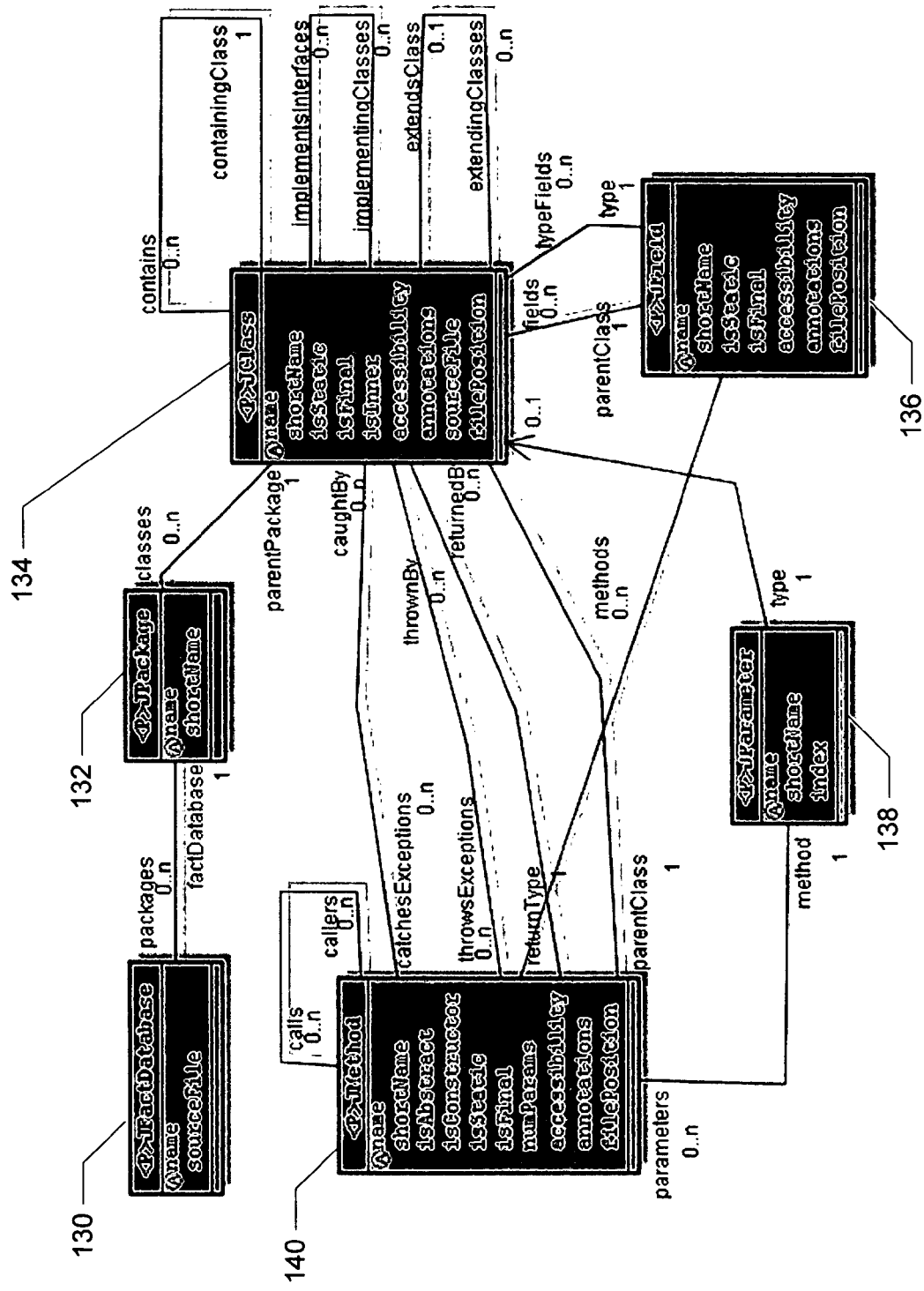
FIG. 3 shows a characteristics model in accordance one embodiment of the invention.

In one embodiment of the system, each of the characteristics models (108A, 108N) describes artifacts (i.e., discrete components) in a particular domain. In one embodiment of the invention, the domain corresponds to any grouping of "related artifacts" (i.e., there is a relationship between the artifacts). Examples of domains include, but are not limited to, a Java™ 2 Enterprise Edition (J2EE) domain (that includes artifacts such as servlets, filters, welcome file, error page, etc.), a networking domain (that includes artifacts such as web server, domain name server, network interface cards, etc), a DTrace domain (that includes artifacts such as network, cpu, process, thread stack, function call, etc.), and Java™ domain (described below). In one embodiment of the invention, each of the characteristics models (108A, 108N) includes one or more artifacts, one or more relationships describing the interaction between the various artifacts, and one or more characteristics that describe various features of the artifact. An example of a characteristics model (108A, 108N) is shown in FIG. 3.

In one embodiment of the invention, the use of characteristics models (108A, 108N) enables a user to analyze the target system (100) with respect to a specific domain. Further, the use of multiple characteristics models (108A, 108N) allows the user to analyze the target system (100) across multiple domains. In addition, the use of multiple characteristics models (108A, 108N) allows the user to analyze the interaction between various domains on the target system (100).

In one embodiment of the invention, other components in the system (e.g., characteristics store (106), characteristics store API (104), query engine (110), etc.) do not directly interact with the characteristics models (108A, 108N). Instead, the other components in the system communicate with the characteristics models (108A, 108N) through the meta model (109). In one embodiment of the invention, the meta model (109) provides a layer of abstraction between the other components in the system and the characteristics models (108A, 108N). Thus, the meta model enables the other components in the system to operate without any knowledge of the actual characteristics models (108A, 108N) currently being used. Thus, the meta model (109) includes functionality to extract specific pieces of information from the characteristics models (108A, 108N) in the system and store this information in a form that may be used by other components within the system. Further, the meta model (109) enables characteristics models (108A, 108N) to be dynamically added and removed from the system (i.e., characteristics models (108A, 108N) may be "plugged-in" to the system). The structure and functionality of the meta model (109) is described below in FIG. 2.

In one embodiment of the invention, the characteristics extractors (e.g., characteristics extractor A (102A), characteristics extractor N (102N)) are used to obtain information about various artifacts (i.e., characteristics) defined in the characteristics models (108A, 108N). In one embodiment of the invention, the characteristics models (108A, 108N) are used to generate the characteristics extractor (e.g., characteristics extractor A (102A), characteristics extractor N (102N)). In one embodiment of the invention, the characteristics extractors (characteristics extractor A (102A), characteristics extractor N (102N)) are generated using the characteristics models (108A, 108N).

In one embodiment of the invention, the characteristics extractor (e.g., characteristics extractor A (102A), characteristics extractor N (102N)) corresponds to an agent loaded on the target system (100) that is configured to monitor and obtain information about the artifacts in the target system (100). Alternatively, the characteristics extractor (e.g., characteristics extractor A (102A), characteristics extractor N (102N)) may correspond to an interface that allows a user to manually input information about one or more artifacts. In another embodiment of the invention, the characteristics extractor (e.g., characteristics extractor A (102A), characteristics extractor N (102N)) may correspond to a process (or system) configured to obtain information about one or more artifacts in the target system (100) by monitoring network traffic received by and sent from the target system (100).

In another embodiment of the invention, the characteristics extractor (e.g., characteristics extractor A (102A), characteristics extractor N (102N)) may correspond to a process (or system) configured to obtain information about one or more artifacts in the target system (100) by sending requests (e.g., pinging, etc.) for specific pieces of information about artifacts in the target system (100) to the target system (100), or alternatively, sending requests to the target system and then extracting information about the artifacts from the responses received from target system (100).

In one embodiment of the invention, if the target system (100) corresponds to source code and the characteristics model (108A, 108N) corresponds to a formal specification of a programming language (e.g., Java™), then the characteristics extractor (e.g., characteristics extractor A (102A), characteristics extractor N (102N)) may correspond to a process that is configured to parse the source code and temporarily store the artifacts and characteristics obtained from parsing the source code in an in-memory object graph.

Those skilled in the art will appreciate that different types of characteristics extractors may be used to obtain information about artifacts in the target system (100). Further, those skilled in the art will appreciate that each characteristics extractor (or set of characteristics extractors) is associated with a particular characteristics model (108A, 108N). Thus, each characteristics extractor typically only retrieves information about artifacts described in the characteristics model (108A, 108N) with which the characteristics extractor is associated. Furthermore, if there are multiple characteristics models (108A, 108N) in the system, then each characteristics model (108A, 108N) may be associated with one or more characteristics extractors.

The information about the various artifacts in the target system (100) obtained by the aforementioned characteristics extractors (characteristics extractor A (102A), characteristics extractor N (102N)) is stored in the characteristics store (106) via the characteristic store API (104). In one embodiment of the invention, characteristics store API (104) provides an interface between the various characteristics extractors (characteristics extractor A (102A), characteristics extractor N (102N)) and the characteristics store (106). Further, the characteristics store API (104) includes information about where in the characteristics store (106) each characteristic obtained from the target system (100) should be stored.

In one embodiment of the invention, the characteristics store (106) corresponds to any storage that includes functionality to store characteristics in a manner that allows the characteristics to be queried. In one embodiment of the invention, the characteristics store (106) may correspond to a persistent storage device (e.g., hard disk, etc). In one embodiment of the invention, the characteristics store (106) corresponds to a relational database that may be queried using a query language such as Structure Query Language (SQL). Those skilled in the art will appreciate that any query language may be used. In one embodiment of the invention, if the characteristics store (106) is a relational database, then the characteristics model (108A, 108N) may be used to generate a schema for storing the characteristics associated with the particular characteristics model (108A, 108N). Those skilled in the art will appreciate that each characteristics model (108A, 108N) within the system may be associated with a separate schema.

In one embodiment of the invention, if the characteristics store (106) is a relational database that includes a schema generated from the characteristics model (108A, 108N), then the characteristics store API (104) includes the necessary information to place characteristics obtained from target system (100) in the appropriate tables in the characteristics store (106). Specifically, the characteristics store API (104) may include information about which table in the characteristics store (106) to place specific pieces of information about artifacts in the target system (100). In one embodiment of the invention, the characteristics store API (104) is generated using the characteristics model (108A, 108N).

In one embodiment of the invention, if the characteristics extractors are configured to temporarily store artifacts and characteristics obtained from the target system in an in-memory object graph, then the characteristic store API (104) is configured to populate the characteristics store (106) using the populated in-memory object graph. In one embodiment of the invention, characteristics store API (104) populates the characteristics store (106) by traversing the in-memory object graph and, for each artifact or characteristic encountered, determining where in the characteristics store (106) to store the artifact or characteristics, in accordance with the schema generated using the characteristics model with which the artifacts and characteristics are associated. In one embodiment of the invention, if the characteristics store (106) includes multiple schemas, then the characteristics store API (104) includes functionality to search the characteristics store (106) for the schema associated with the particular artifacts and/or characteristics.

In one embodiment of the invention, if the characteristics store (106) includes a schema, then the mapping of individual components (e.g., artifacts, characteristics, relationships) in the characteristics models (108A, 108N) to the various tables within the schema is stored in the corresponding characteristics model (108A, 108N).

Continuing with the discussion of FIG. 1, in one embodiment of the invention, the query engine (110) is configured to issue queries to the characteristics store (106). In one embodiment of the invention, the queries issued by the query engine (110) enable a user (e.g., a system developer, etc.) to analyze the target system (100). In particular, in one embodiment of the invention, the query engine (110) is configured to enable the user to analyze the presence of specific software patterns in the target system as well as the interaction between various software patterns in the target system.

In one embodiment of the invention, a software pattern corresponds to a framework that defines how specific components in the target system should be configured (e.g., what types of information each component should manage, what interfaces should each component expose), and how the specific components should communicate with each other (e.g., what data should be communicated to other components, etc.). Software patterns are typically used to address a specific problem in a specific context (i.e., the software/system environment in which the problem arises). Said another way, software patterns may correspond to a software architectural solution that incorporates best practices to solve a specific problem in a specific context.

Continuing with the discussion of FIG. 1, the query engine (110) may also be configured to issue queries about the interaction of specific software patterns with components that do not belong to a specific software pattern. Further, the query engine (110) may be configured to issue queries about the interaction of components that do not belong to any software patterns. In one embodiment of the invention, the query engine (110) includes functionality to verify the query using the meta model (109) prior to issuing the query to the characteristics store (106). The verification of the query using the meta model (109) is described below in FIG. 6.

In one embodiment of the invention, the query engine (110) may include pre-specified queries and/or enable to the user to specify custom queries. In one embodiment of the invention, both the pre-specified queries and the custom queries are used to identify the presence of one or more software patterns and/or the presence of components that do not belong to a pattern in the target system (100). In one embodiment of the invention, the pre-specified queries and the custom queries are specified using a Pattern Query Language (PQL). In one embodiment of the invention, PQL enables the user to query the artifacts and characteristics of the artifacts stored in the characteristics store (106) to determine the presence of a specific software pattern, specific components of a specific software pattern, and/or other components that are not part of a software pattern, within the target system (100).

In one embodiment of the invention, the query engine (110) may include information (or have access to information) about the characteristics model (108A, 108N) that includes the artifact and/or characteristics being queried. Said another way, if the query engine (110) is issuing a query about a specific artifact, then the query engine (110) includes information (or has access to information) about the characteristics model to which the artifact belongs. Those skilled in the art will appreciate that the query engine (110) only requires information about the particular characteristics model (108A, 108N) to the extent the information is required to issue the query to the characteristics store (106).

Those skilled in the art will appreciate that the query engine (110) may include functionality to translate PQL queries (i.e., queries written in PQL) into queries written in a query language understood by the characteristics store (106) (e.g., SQL). Thus, a query written in PQL may be translated into an SQL query prior to being issued to the characteristics store (106). In this manner, the user only needs to understand the artifacts and/or characteristics that the user wishes to search for and how to express the particular search using PQL. The user does not need to be concerned with how the PQL query is handled by the characteristics store (106).

Further, in one or more embodiments of the invention, PQL queries may be embedded in a programming language such as Java™, Groovy, or any other programming language capable of embedding PQL queries. Thus, a user may embed one or more PQL queries into a program written in one of the aforementioned programming languages. Upon execution, the program issues one or more PQL queries embedded within the program and subsequently receives and processes the results prior to displaying them to the user. Those skilled in the art will appreciate that the processing of the results is performed using functionality of the programming language in which the PQL queries are embedded.

In one embodiment of the invention, the results of the individual PQL queries may be displayed using the visualization engine (112). In one embodiment of the invention, the visualization engine (112) is configured to output the results of the queries on a display device (i.e., monitor, printer, projector, etc.).

Figure 2:
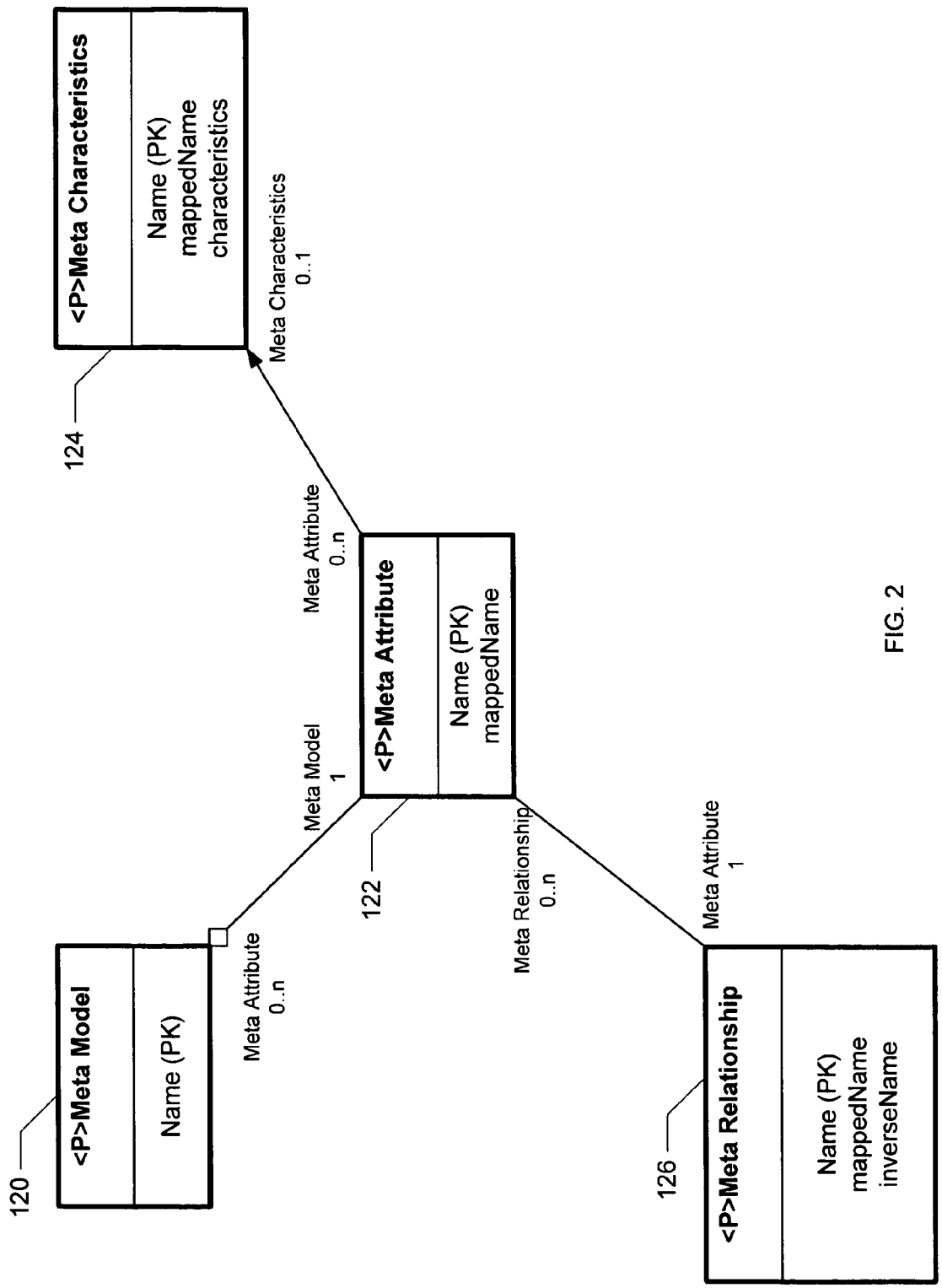
FIG. 2 shows a meta model schema in accordance with one embodiment of the invention.

FIG. 2 shows a meta model schema in accordance with one embodiment of the invention. As discussed above, the function of the meta model (109) is to provide a layer of abstraction between the components of the system and the characteristics models (108A, 108N). In one embodiment of the invention, the meta model (109) corresponds to a model that stores information that describes characteristics models (108A, 108N). More specifically, the meta model (109) stores meta model instances of the characteristics models (108A, 108N), where each meta model instance of the characteristics model (108A, 108N) corresponds to the representation of the particular characteristics model within the meta model (109). In one embodiment of the invention, the representation of a characteristics model (108A, 108N) in the meta model is dictated by the meta model schema. An example of a meta model schema shown in FIG. 2.

As shown in FIG. 2, the meta model schema includes four entities: a meta model entity (120), a meta attribute entity (122), a meta characteristics entity (124), and a meta relationship entity (126). The meta model entity (120) represents a characteristics model (109). The meta model entity (120) may include zero or more meta attribute entities (122), where each meta attribute entity (122) is configured to store a name of an attribute associated with a characteristics model (108A, 108N). Each meta attribute entity (122) is associated with zero or more meta characteristics (124), where each meta characteristics is configured to store a name of a characteristic associated with the attribute stored in the associated meta attribute entity (122). In addition, each meta attribute entity (122) is also associated with zero or more meta relationships (126), where each meta relationship (126) is configured to store a name of relationship associated with the attribute store in the associated meta attribute entity (122). Exemplary information stored in each of the aforementioned entities is shown in FIG. 2.

In one embodiment of the invention, the meta model (109) includes exemplary information as described in the meta model schema shown in FIG. 2. However, the additional information associated with the particular characteristics model is maintained in the characteristics models (108A, 108N).

Those skilled in the art will appreciate that the meta model schema only describes the organization of the information within the meta model and that the actual implementation of the meta model schema may vary in different implementations. In one embodiment of the invention, the meta model is implemented as a relational database configured using the meta model schema.

In addition to extracting and storing information about characteristics models (108A, 108N) within the system, the meta model (109) includes functionality to remove information that corresponds to characteristics models (108A, 108N) that have been removed from the system. Further, the meta model (109) may also include functionality to request information from the specific characteristics models (108A, 108N) (e.g., information about how the specific attributes, characteristics, and relationships are represented in the characteristics store, etc.). The meta model (109) also includes functionality to traverse and/or search the contents of the meta model to determine the presence of a specific artifact, characteristic, or relationship between artifacts in the system.

As discussed above, each characteristics model defines one or more artifacts, one or more relationships between the artifacts, and one or more characteristics for each artifact. In one embodiment of the invention, the characteristics model corresponds to a formal specification of a domain. The following is an example of a Java™ characteristics model that is formal specification of a Java™ language domain in accordance with one embodiment of the invention.

| Java ™ Characteristics Model |
|---|
| 1   persistent class JFactDatabase { |
| 2   long id primary key; |
| 3   String version; |
| 4   String name; |
| 5   String sourceFile; |
| 6   references JPackage packages(0,n) inverse factDatabase(1,1); |
| 7   } // class JFactDatabase |
| 8 |
| 9   persistent class JPackage { |
| 10  long id primary key; |
| 11  String version; |
| 12  String name; |
| 13  String shortName; |
| 14  references JPackage packages (0,n) inverse parentPackage(1,1); |
| 15  references JClass classes (0,n) inverse parentPackage(1,1); |
| 16  } // class JPackage |
| 17 |
| 18  persistent class JClass { |
| 19  long id primary key; |
| 20  String version; |
| 21  String name; |
| 22  String shortName; |
| 23  Boolean isStatic; |
| 24  Boolean isFinal; |
| 25  Boolean isInner; |
| 26  String accessibility; |
| 27  String sourceFile; |
| 28  Integer filePosition; |
| 29  references JClass implementsInterfaces(0,n) inverse implementingClasses(0,n); |
| 30  references JClass extendsClass(0,1) inverse extendingClasses(0,n); |
| 31  references JClass contains(0,n) inverse containingClass(1,1); |
| 32  references JMethod methods(0,n) inverse parentClass(1,1); |
| 33  references JField fields(0,n) inverse parentClass(1,1); |
| 34  references JAnnotation annotations(0,n) inverse parentClass(1,1); |
| 35  } // class JClass |
| 36 |
| 37  persistent class JMethod { |
| 38  long id primary key; |
| 39  String version; |
| 40  String name; |
| 41  String shortName; |
| 42  Boolean isAbstract; |
| 43  Boolean isConstructor; |
| 44  Boolean isStatic; |
| 45  Boolean isFinal; |
| 46  Integer numParams; |

| -continued |
|---|
| Java ™ Characteristics Model |
| 47  String accessibility; |
| 48  Integer filePosition; |
| 49  references JClass returnType(1,1) inverse returnedBy(0,n); |
| 50  references JClass throwsExceptions(0,n) inverse thrownBy(0,n); |
| 51  references JClass catchesExceptions(0,n) inverse caughtBy(0,n); |
| 52  references JClass instantiates(0,n) inverse instantiatedBy(0,n); |
| 53  references JMethod calls(0,n) inverse callers(0,n); |
| 54  references JParameter parameters(0,n) inverse method(1,1); |
| 55  references JField usedFields(0,n) inverse usedByMethods(0,n); |
| 56  references JAnnotation annotations(0,n) inverse parentMethod(1,1); |
| 57  } // class JMethod |
| 58 |
| 59  persistent class JField { |
| 60  long id primary key; |
| 61  String version; |
| 62  String name; |
| 63  String shortName; |
| 64  Boolean isStatic; |
| 65  Boolean isFinal; |
| 66  String accessibility; |
| 67  Integer filePosition; |
| 68  references JClass type(1,1) inverse typeFields(0,n); |
| 69  references JAnnotation annotations(0,n) inverse parentField(1,1); |
| 70  } // class JField |
| 71 |
| 72  persistent class JParameter { |
| 73  long id primary key; |
| 74  String version; |
| 75  String name; |
| 76  String shortName; |
| 77  Integer index; |
| 78  references JClass type(1,1) inverse typeParameters(0,n); |
| 79  references JAnnotation annotations(0,n) inverse parentParameter(1,1); |
| 80  } // class JParameter |
| 81 |

In the above Java™ characteristics model, the JFactDatabase artifact is defined in lines 1-7, the JPackage artifact is defined in lines 9-16, the JClass artifact is defined in lines 18-35, the JMethod artifact is defined in lines 37-57, the JField artifact is defined in lines 59-70, and the JParameter artifact is defined in lines 72-80. A graphical representation of the Java™ characteristics model described above is shown in FIG. 3. Specifically, FIG. 3 shows each of the aforementioned Java™ characteristics model attributes (i.e., JFactDatabase, JPackage, JClass, JField, JParameter, and JMethod) as well as the characteristics associated with each of the aforementioned artifacts and the relationships between the aforementioned artifacts. In particular, box (130) corresponds to the JFactDatabase artifact, box (132) corresponds to the JPackage artifact, box (134) corresponds to the JClass artifact, box (136) corresponds to the JField artifact, box (138) corresponds to the JParameter artifact, and box (140) corresponds to the JMethod artifact.

As discussed above, the characteristics model is used to generate a schema. The following text describes a textual representation of a Java™ schema generated using the Java™ characteristics model shown in FIG. 3.

| Java ™ Schema |
|---|
| 1   CREATE TABLE JFactDatabase( |
| 2   id INTEGER, |
| 3   version VARCHAR(255), |

-continued

Java ™ Schema

```
4       name VARCHAR(255),
5       sourceFile VARCHAR(255),
6       PRIMARY KEY ( id )
7    );
8
9  CREATE UNIQUE INDEX JFactDatabase__PRIMARY__KEY ON JFactDatabase(id);
10 CREATE UNIQUE INDEX JFactDatabase__name ON JFactDatabase(name);
11 COMMIT;
12
13 CREATE TABLE JPackage(
14     id INTEGER,
15     version VARCHAR(255),
16     name VARCHAR(255),
17     shortName VARCHAR(255),
18     factDatabase INTEGER,
19     PRIMARY KEY ( id )
20  );
21
22 CREATE UNIQUE INDEX JPackage__PRIMARY__KEY ON JPackage(id);
23 CREATE UNIQUE INDEX JPackage__name ON JPackage(name);
24 COMMIT;
25
26 CREATE TABLE JClass(
27     id INTEGER,
28     version VARCHAR(255),
29     name VARCHAR(255),
30     shortName VARCHAR(255),
31     isStatic BOOLEAN,
32     isFinal BOOLEAN,
33     isInner BOOLEAN,
34     accessibility VARCHAR(255),
35     sourceFile VARCHAR(255),
36     filePosition INTEGER,
37     parentPackage INTEGER,
38     extendsClass INTEGER,
39     containingClass INTEGER,
40     PRIMARY KEY ( id )
41  );
42
43 CREATE UNIQUE INDEX JClass__PRIMARY__KEY ON JClass(id);
44 CREATE UNIQUE INDEX JClass__name ON JClass(name);
45 COMMIT;
46
47 CREATE TABLE JClass__ImplementsInterfaces( -- JOIN table for m:n relationship
48     implementsInterfaces INTEGER,
49     implementingClasses INTEGER,
50     PRIMARY KEY ( implementsInterfaces,implementingClasses ),
51     KEY(implementsInterfaces), KEY(implementingClasses)
52  );
53
54 CREATE TABLE JClass__ImplementsInterfacesTransitive( -- JOIN table for m:n relationship
55     implementsInterfaces INTEGER,
56     implementingClasses INTEGER,
57     PRIMARY KEY ( implementsInterfaces,implementingClasses ),
58     KEY(implementsInterfaces), KEY(implementingClasses)
59  );
60
61 COMMIT;
62
63 CREATE TABLE JClass__ExtendsClasses( -- JOIN table for m:n relationship
64     extendsClasses INTEGER,
65     extendingClasses INTEGER,
66     PRIMARY KEY ( extendsClasses,extendingClasses ),
67     KEY(extendsClasses), KEY(extendingClasses)
68  );
69
70 CREATE TABLE JClass__ExtendsClassesTransitive( -- JOIN table for m:n relationship
71     extendsClasses INTEGER,
72     extendingClasses INTEGER,
73     PRIMARY KEY ( extendsClasses,extendingClasses ),
74     KEY(extendsClasses), KEY(extendingClasses)
75  );
76 COMMIT;
77
78 CREATE TABLE JMethod__Calls(
79     calls INTEGER,
80     callers INTEGER,
```

-continued

| Java ™ Schema |
|---|

```
 81       filePosition INTEGER,
 82       PRIMARY KEY (calls,callers),
 83       KEY(calls), KEY(callers)
 84     );
 85  CREATE TABLE JMethod_CallsTransitive(
 86       calls INTEGER,
 87       callers INTEGER,
 88       filePosition INTEGER,
 89       PRIMARY KEY (calls,callers),
 90       KEY(calls), KEY(callers)
 91     );
 92  COMMIT;
 93
 94  CREATE TABLE JMethod_ThrowsExceptions(
 95       throwsExceptions INTEGER,
 96       thrownBy INTEGER,
 97       filePosition INTEGER,
 98       PRIMARY KEY ( throwsExceptions,thrownBy ),
 99       KEY(throwsExceptions), KEY(thrownBy)
100     );
101  COMMIT;
102
103  CREATE TABLE JMethod_CatchesExceptions(
104       catchesExceptions INTEGER,
105       caughtBy INTEGER,
106       filePosition INTEGER,
107       PRIMARY KEY ( catchesExceptions,caughtBy ),
108       KEY(catchesExceptions), KEY(caughtBy)
109     );
110  COMMIT;
111  CREATE TABLE JMethod_Instantiates(
112       callingMethod      INTEGER,
113       instantiatedClass   INTEGER,
114       filePosition INTEGER,
115       PRIMARY KEY ( callingMethod,instantiatedClass ),
116       KEY(callingMethod), KEY(instantiatedClass)
117     );
118
119  CREATE TABLE JMethod_InstantiatesTransitive(
120       callingMethod      INTEGER,
121       instantiatedClass   INTEGER,
122       filePosition INTEGER,
123       PRIMARY KEY ( callingMethod,instantiatedClass ),
124       KEY(callingMethod), KEY(instantiatedClass)
125     );
126  COMMIT;
127
128  CREATE TABLE JMethod(
129       id INTEGER,
130       version VARCHAR(255),
131       name VARCHAR(255),
132       shortName VARCHAR(255),
133       isAbstract BOOLEAN,
134       isConstructor BOOLEAN,
135       isStatic BOOLEAN,
136       isFinal BOOLEAN,
137       numParams INTEGER,
138       accessibility VARCHAR(255),
139       filePosition INTEGER,
140       parentClass INTEGER,
141       returnType INTEGER,
142       PRIMARY KEY ( id )
143     );
144
145  CREATE UNIQUE INDEX JMethod_PRIMARY_KEY ON JMethod(id);
146  CREATE UNIQUE INDEX JMethod_name ON JMethod(name);
147  COMMIT;
148
149  CREATE TABLE JMethod_UsedFields(
150       usedFields INTEGER,
151       usedByMethods INTEGER,
152       filePosition INTEGER,
153       PRIMARY KEY ( usedFields,usedByMethods ),
154       KEY(usedFields), KEY(usedByMethods)
155     );
156  COMMIT;
157
```

-continued

| Java ™ Schema |
|---|

```
158  CREATE TABLE JField(
159      id INTEGER,
160      version VARCHAR(255),
161      name VARCHAR(255),
162      shortName VARCHAR(255),
163      isStatic BOOLEAN,
164      isFinal BOOLEAN,
165      accessibility VARCHAR(255),
166      filePosition INTEGER,
167      parentClass INTEGER,
168      type INTEGER,
169      PRIMARY KEY ( id )
170  );
171
172  CREATE UNIQUE INDEX JField__PRIMARY__KEY ON JField(id);
173  CREATE UNIQUE INDEX JField__name ON JField(name);
174  COMMIT;
175
176  CREATE TABLE JParameter(
177      id INTEGER PRIMARY KEY,
178      version VARCHAR(255),
179      name VARCHAR(255),
180      shortName VARCHAR(255),
181      parameterIndex INTEGER,
182      method INTEGER,
183      type INTEGER
184  );
185
186  CREATE UNIQUE INDEX JParameter__PRIMARY__KEY ON JParameter(id);
187  CREATE UNIQUE INDEX JParameter__name ON JParameter(name);
188  COMMIT;
189
190  CREATE TABLE JAnnotation(
191      id INTEGER PRIMARY KEY,
192      version VARCHAR(255),
193      name VARCHAR(255),
194      shortName VARCHAR(255),
195      numArgs INTEGER,
196      parentClass INTEGER,
197      parentMethod INTEGER,
198      parentField INTEGER,
199      parentParameter INTEGER,
200      type INTEGER
201  );
202
203  CREATE UNIQUE INDEX JAnnotation__PRIMARY__KEY ON JAnnotation(id);
204  CREATE UNIQUE INDEX JAnnotation__name ON JAnnotation(name);
205  COMMIT;
206
207  CREATE TABLE JAnnotationArgument(
208      id INTEGER PRIMARY KEY,
209      version VARCHAR(255),
210      name VARCHAR(255),
211      shortName VARCHAR(255),
212      stringValue VARCHAR(10000),
213      annotation INTEGER,
214      type INTEGER
215  );
216
217  CREATE UNIQUE INDEX JAnnotationArgument__PRIMARY__KEY ON
218  JAnnotationArgument(id);
219  CREATE UNIQUE INDEX JAnnotationArgument__name ON JAnnotationArgument(name);
220  COMMIT;
221
222  CREATE TABLE WriteVariable(
223
224      cookie VARCHAR(255),
225      scope INTEGER,
226      name VARCHAR(255),
227      varIndex INTEGER,
228      nodeId DECIMAL(20,0),
229      nodeName VARCHAR(255)
230  );
231
232  COMMIT;
233
234  CREATE TABLE ReadVariable(
```

-continued

Java ™ Schema

```
235
236        cookie VARCHAR(255),
237        scope INTEGER,
238        name VARCHAR(255),
239        varIndex INTEGER,
240        nodeId DECIMAL(20,0),
241        nodeName VARCHAR(255)
242    );
243
244  CREATE UNIQUE INDEX ReadVariable__PRIMARY__KEY ON
245  ReadVariable(cookie,scope,name,varIndex);
246  COMMIT;
247
248  ALTER TABLE JPackage ADD CONSTRAINT JPackage__factDatabase FOREIGN KEY
249       (factDatabase) REFERENCES JFactDatabase(id);
250  ALTER TABLE JClass ADD CONSTRAINT JClass__parentPackage FOREIGN KEY
251       (parentPackage) REFERENCES JPackage(id);
252  ALTER TABLE JClass ADD CONSTRAINT JClass__extendsClass FOREIGN KEY
253       (extendsClass) REFERENCES JClass(id);
254  ALTER TABLE JClass ADD CONSTRAINT JClass__containingClass FOREIGN KEY
255       (containingClass) REFERENCES JClass(id);
256  ALTER TABLE JClass__ImplementsInterfaces ADD CONSTRAINT
257       JClass__ImplementsInterfaces__fk__for__implementsInterfaces FOREIGN KEY
258       (implementsInterfaces) REFERENCES JClass(id);
259  ALTER TABLE JClass__ImplementsInterfaces ADD CONSTRAINT
260       JClass__ImplementsInterfaces__fk__for__implementingClasses FOREIGN KEY
261       (implementingClasses) REFERENCES JClass(id);
262  ALTER TABLE JClass__ExtendsClasses ADD CONSTRAINT
263       JClass__ExtendsClasses__fk__for__extendsClasses FOREIGN KEY (extendsClasses)
264       REFERENCES JClass(id);
265  ALTER TABLE JClass__ExtendsClasses ADD CONSTRAINT
266       JClass__ExtendsClasses__fk__for__extendingClasses FOREIGN KEY (extendingClasses)
267       REFERENCES JClass(id);
268  ALTER TABLE JMethod__ThrowsExceptions ADD CONSTRAINT
269       JMethod__ThrowsExceptions__fk__for__throwsExceptions FOREIGN KEY
270       (throwsExceptions) REFERENCES JMethod(id);
271  ALTER TABLE JMethod__ThrowsExceptions ADD CONSTRAINT
272       JMethod__ThrowsExceptions__fk__for__thrownBy FOREIGN KEY (thrownBy)
273       REFERENCES JClass(id);
274  ALTER TABLE JMethod__CatchesExceptions ADD CONSTRAINT
275       JMethod__CatchesExceptions__fk__for__catchesExceptions FOREIGN KEY
276       (catchesExceptions) REFERENCES JMethod(id);
277  ALTER TABLE JMethod__CatchesExceptions ADD CONSTRAINT
278       JMethod__CatchesExceptions__fk__for__caughtBy FOREIGN KEY (caughtBy)
279       REFERENCES JClass(id);
280  ALTER TABLE JMethod ADD CONSTRAINT JMethod__parentClass FOREIGN KEY
281       (parentClass) REFERENCES JClass(id);
282  ALTER TABLE JMethod ADD CONSTRAINT JMethod__returnType FOREIGN KEY
283       (returnType) REFERENCES JClass(id);
284  ALTER TABLE JMethod__Calls ADD CONSTRAINT JMethod__Calls__fk__for__calls FOREIGN
285       KEY (calls) REFERENCES JMethod(id);
286  ALTER TABLE JMethod__Calls ADD CONSTRAINT JMethod__Calls__fk__for__callers FOREIGN
287       KEY (callers) REFERENCES JMethod(id);
288  ALTER TABLE JMethod__UsedFields ADD CONSTRAINT
289       JMethod__UsedFields__fk__for__usedFields FOREIGN KEY (usedFields) REFERENCES
290       JMethod(id);
291  ALTER TABLE JMethod__UsedFields ADD CONSTRAINT
292       JMethod__UsedFields__fk__for__usedByMethods FOREIGN KEY (usedByMethods)
293       REFERENCES JField(id);
294  ALTER TABLE JField ADD CONSTRAINT JField__parentClass FOREIGN KEY (parentClass)
295       REFERENCES JClass(id);
296  ALTER TABLE JField ADD CONSTRAINT JField__type FOREIGN KEY (type)
297       REFERENCES JClass(id);
298  ALTER TABLE JParameter ADD CONSTRAINT JParameter__method FOREIGN KEY
299       (method) REFERENCES JMethod(id);
300  ALTER TABLE JParameter ADD CONSTRAINT JParameter__type FOREIGN KEY (type)
301       REFERENCES JClass(id);
302  ALTER TABLE JAnnotation ADD CONSTRAINT JAnnotation__parentClass FOREIGN KEY
303       (parentClass) REFERENCES JClass(id);
304  ALTER TABLE JAnnotation ADD CONSTRAINT JAnnotation__parentMethod FOREIGN KEY
305       (parentMethod) REFERENCES JMethod(id);
306  ALTER TABLE JAnnotation ADD CONSTRAINT JAnnotation__parentField FOREIGN KEY
307       (parentField) REFERENCES JField(id);
308  ALTER TABLE JAnnotation ADD CONSTRAINT JAnnotation__parentParameter FOREIGN
309       KEY (parentParameter) REFERENCES JParameter(id);
310  ALTER TABLE JAnnotation ADD CONSTRAINT JAnnotation__type FOREIGN KEY (type)
311       REFERENCES JClass(id);
```

-continued

Java™ Schema

```
312  ALTER TABLE JAnnotationArgument ADD CONSTRAINT JAnnotationArgument_annotation
313       FOREIGN KEY (annotation) REFERENCES JAnnotation(id);
314  ALTER TABLE JAnnotationArgument ADD CONSTRAINT JAnnotationArgument_type
315       FOREIGN KEY (type) REFERENCES JClass(id);
```

The following describes the various portions of the Java™ Schema: (i) lines 1-11 define the table associated with the JFactDatabase artifact; (ii) lines 13-24 define the table associated with the JPackage artifact; (iii) lines 26-45 define the table associated with the JClass artifact; (iv) lines 47-76 define various join tables used to represent various m:n relationships defined in the Java™ characteristics model shown in FIG. 3 for the JClass artifact; (v) lines 128-147 define the table associated with the JMethod artifact; (vi) lines 78-126 and 149-157 define various tables used to represent various relationships defined in the Java™ characteristics mode shown in FIG. 3 for the JMethod artifact; (vii) lines 158-174 define the table associated with the JField artifact; (viii) lines 176-188 define the table associated with the JParameter artifact; (ix) lines 190-247 define additional tables used to implement the Java™ schema; (x) lines 248-315 define the various relationships (e.g., 1:1 and 1:n) between the various artifacts defined in the Java™ characteristics model.

Figure 4:
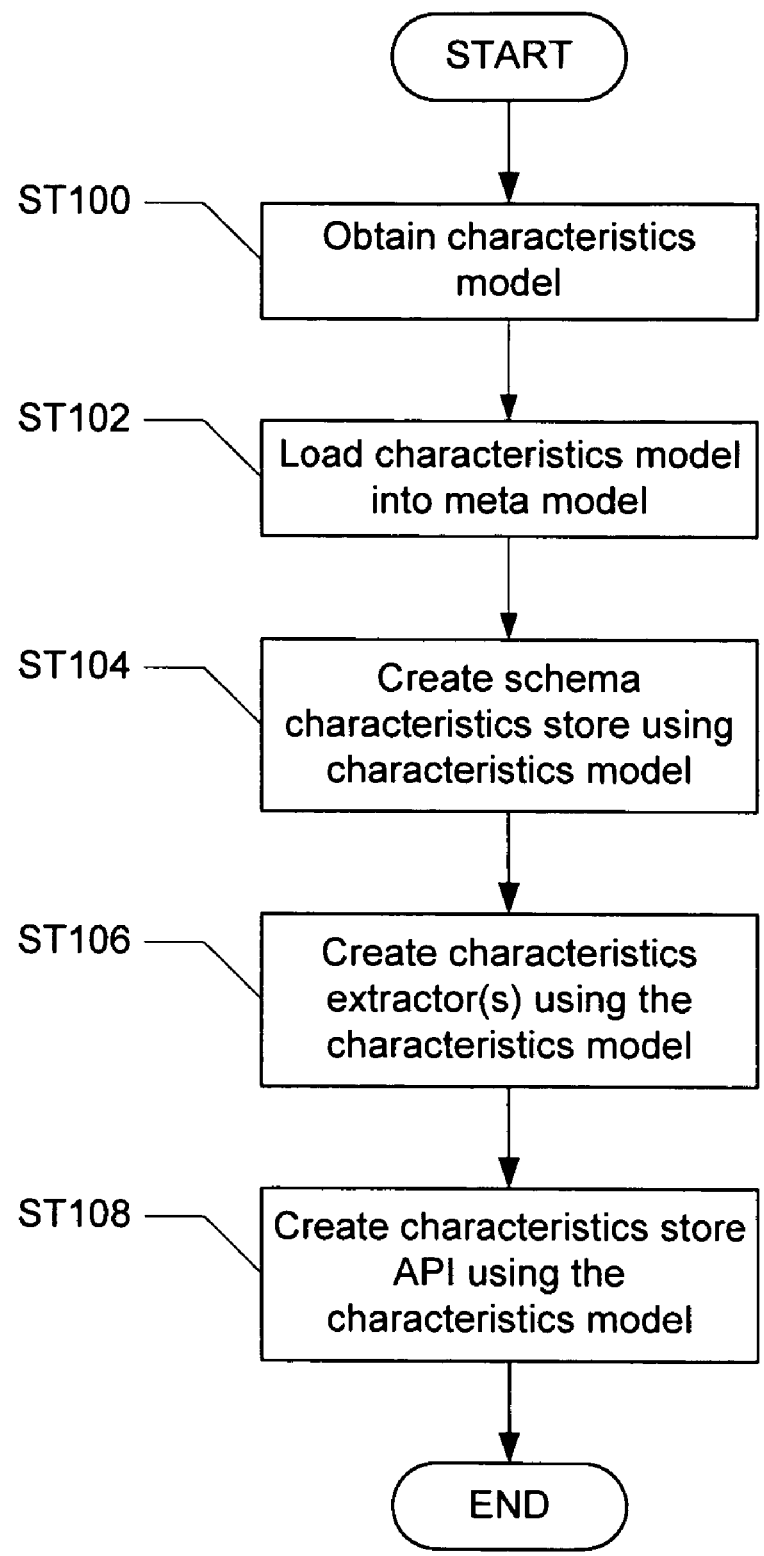
FIGS. 4 through 6 show flowcharts in accordance with one embodiment of the invention.

FIG. 4 shows a flowchart in accordance with one embodiment of the invention. Initially, a characteristics model is obtained (ST100). In one embodiment of the invention, the characteristics model is obtained from a predefined set of characteristics models. Alternatively, the characteristics model is a customized characteristics model to analyze a specific domain in the target system and obtained from a source specified by the user. The characteristics model is subsequently loaded into the meta model (ST102). In one embodiment of the invention, "loading" the characteristics model into the meta model includes extracting specific pieces of information about the characteristics model (such as the information described in the meta model schema shown in FIG. 2) and loading the extracted information into the meta model.

Continuing with the discussion of FIG. 4, a schema for the characteristics store is subsequently created and associated with characteristics model (ST104). One or more characteristics extractors associated with characteristics model are subsequently created (ST106). Finally, a characteristics store API is created (ST108). In one embodiment of the invention, creating the characteristics store API includes creating a mapping between characteristics obtained by the characteristics extractors and tables defined by the schema configured to store the characteristics in the characteristics store.

Those skilled in the art will appreciate that ST100-ST108 may be repeated for each characteristics model. In addition, those skilled in the art will appreciate that once a characteristics store API is created, the characteristics store API may only need to be modified to support additional schemas in the characteristics data store and additional characteristics extractors. Alternatively, each characteristics model may be associated with a different characteristics store API.

Figure 5:
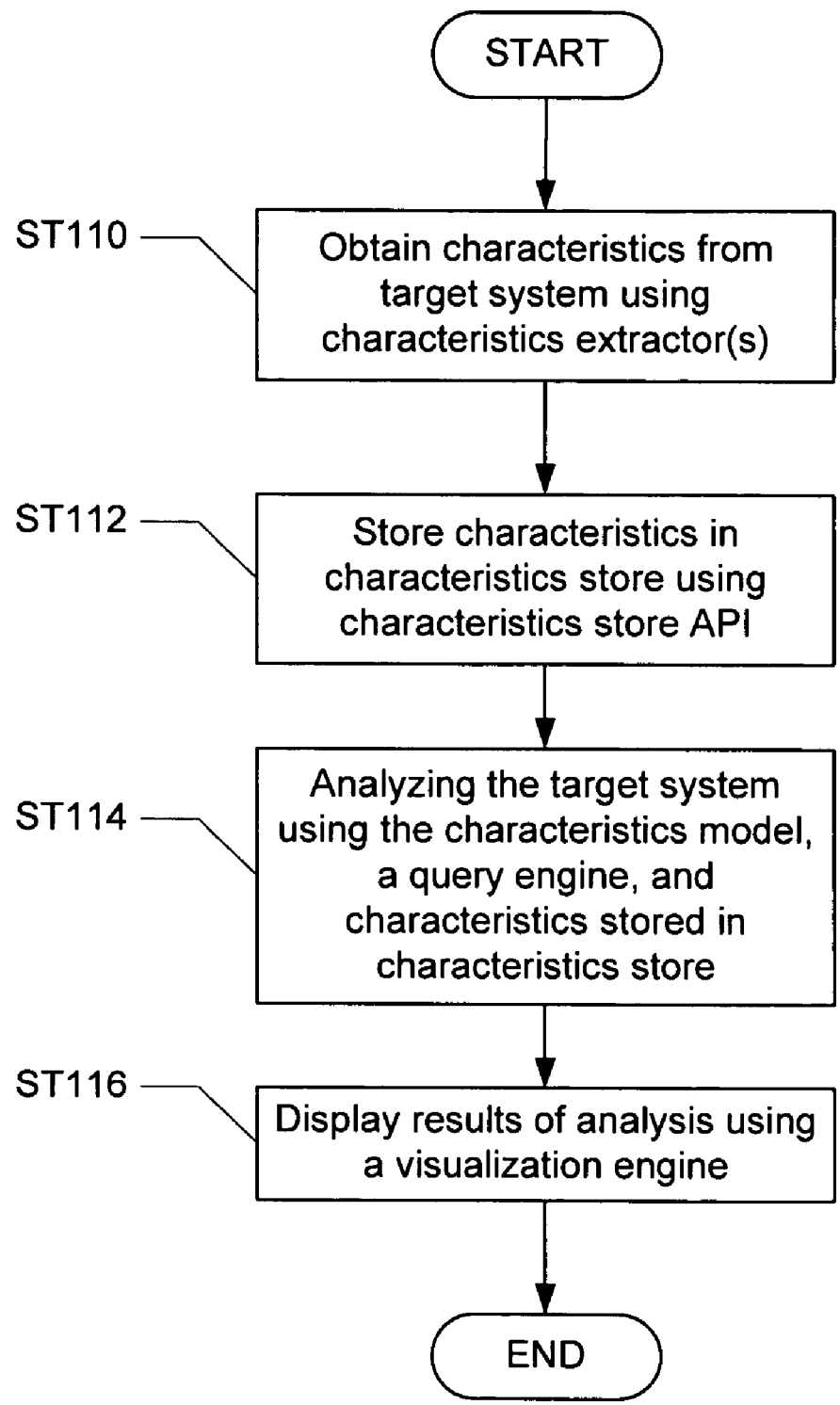

At this stage, the system is ready to analyze a target system. FIG. 5 shows a flowchart in accordance with one embodiment of the invention. Initially, characteristics are obtained from the target system using one or more characteristics extractors (ST110). In one embodiment of the invention, the characteristics extractors associated with a given characteristics model only obtain information about characteristics associated with the artifacts defined in the characteristics model.

Continuing with the discussion of FIG. 5, the characteristics obtained from the target system using the characteristics extractors are stored in the characteristics store using the characteristics store API (ST112). Once the characteristics are stored in the characteristics store, the target system may be analyzed using the characteristics model (or models), the query engine, the meta model, and the characteristics stored in the characteristics store (ST114) (describe below in FIG. 6). In one embodiment of the invention, the user uses the query engine to issue queries to characteristics store. As discussed above, the query engine has access, via the meta model, to information about the characteristics models currently being used to analyze the target system. The results of the analysis are subsequently displayed using a visualization engine (ST116).

Figure 6:
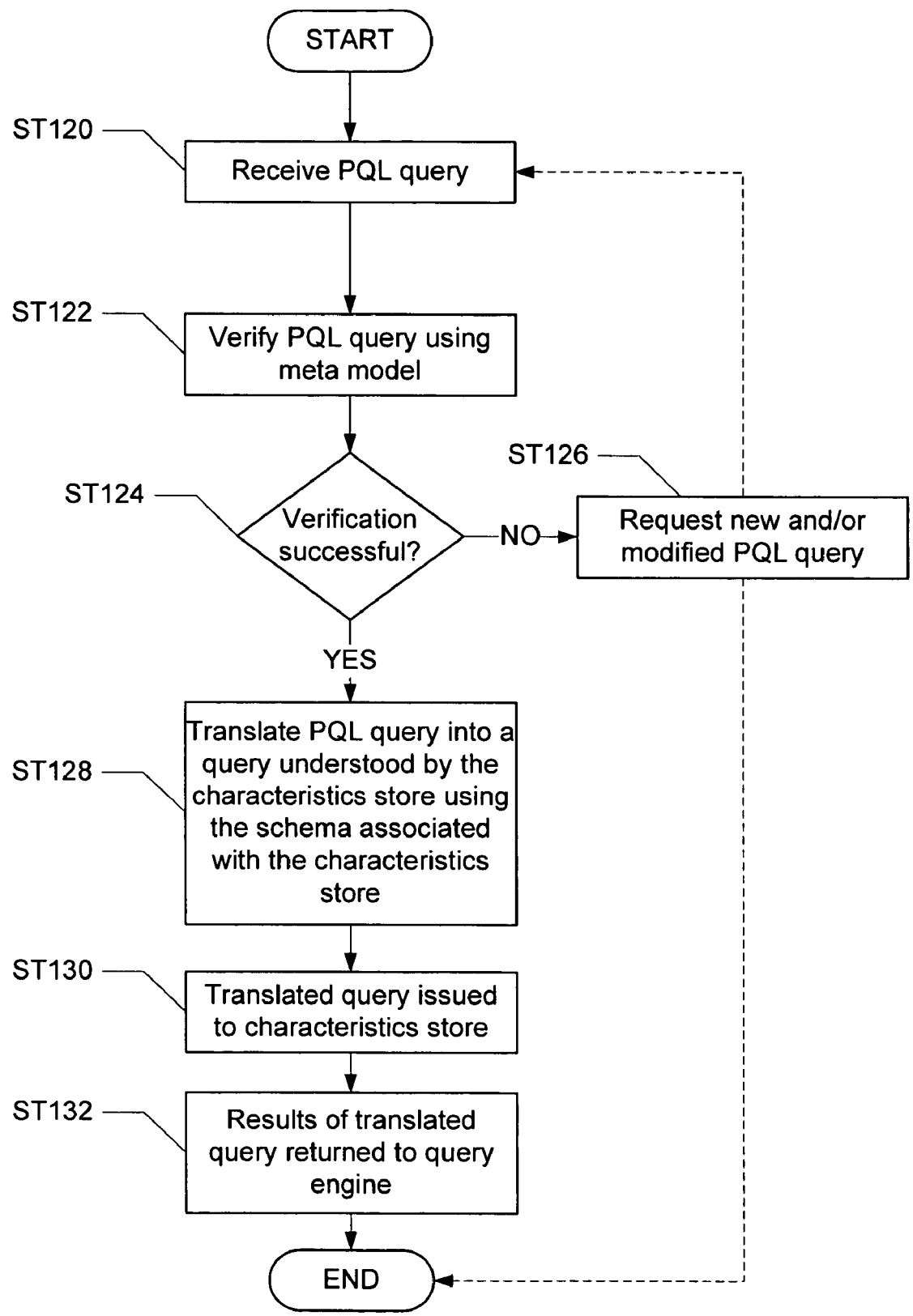

FIG. 6 shows a flowchart in accordance with one embodiment of the invention. Initially, a PQL query is received by the query engine (ST120). The PQL query is subsequently verified using the meta model (ST122). In one embodiment of the invention, verifying the PQL query includes searching the meta model to determine whether each component in the PQL query (i.e., artifact, characteristic, or relationship) is present in the meta model. If the meta model is implemented as a series of tables in accordance with a meta model schema (such as the one shown in FIG. 2), then searching the meta model includes searching the various tables in the meta model.

A determination of whether the verification of the PQL query was successful is subsequently made (ST124). The verification of the PQL query is successful if every component in the PQL query is present in the meta model.

The following is an example of PQL query and the process involved in verifying the various components of the PQL query.

Query

SELECT c from JClass c WHERE c.parentPackage.name="java.lang"

When the above query is submitted to the meta model for verification, the meta model first determines whether the "JClass" component is present in the meta model. Assuming that the Java™ characteristics model (described above) is loaded into the meta model, then the meta model will discover that "JClass" is an artifact. Next, the meta model will attempt to verify whether "c.parentPackage.name" is a valid component. Since "c" is selected from "JClass" (as defined in the query), the component "c.parentPackage.name" may be re-written as "JClass.parentPackage.name." As defined in the Java™ characteristics model discussed above, "JClass" is related to "JPackage" through a "parentPackage" relationship. Further, "name" is a characteristic of "JPackage," thus the component "JClass.parentPackage.name" is a valid component. As there are no other components in the query to verify, the verification of the query is complete and successful.

Continuing with the discussion of FIG. 6, if the verification is not successful, then the query engine may request a new or modified PQL query (ST126). If a new or modified PQL query is submitted, then the method proceeds to ST120. Alternatively, if a new or modified PQL query is not submitted, then the method ends. Those skilled in the art will appreciate that the meta model may also issue an error message indicating that the verification was not successful.

If the PQL query is successfully verified, then PQL query is translated into a query understood by the characteristics store using the schema(s) associated with the various components in the PQL query (ST128). As discussed above, the characteristics store may not include functionality to query the characteristics using a PQL query. In such cases, the PQL query is translated into a query understood by the characteristics store, for example, an SQL query. In one embodiment of the invention, translating the PQL query into, for example, an SQL query includes obtaining information about how specific components (i.e., artifacts, characteristics, and relationships) are referred to in the characteristics store. Thus, the meta model, upon successful verification of the PQL query, may query the individual characteristics models to determine how each of the components in the PQL query are represented in the characteristics store (i.e., what table each component is in, what name is used to refer to the component in the characteristics store, etc.).

Continuing with the discussion of FIG. 6, the query resulting from the translation is subsequently issued to the characteristics store (ST130), and the results of the query are then returned to the query engine (ST132). Those skilled in the art will appreciate that while FIG. 6 refers to PQL and SQL queries, other query languages (such as those discussed above) may be used. Further, those skilled in the art will appreciate that STI10-ST112 may be performed concurrently with ST114-ST116. In addition, steps in FIG. 4, FIG. 5, and FIG. 6 may be performed concurrently.

Figure 7:
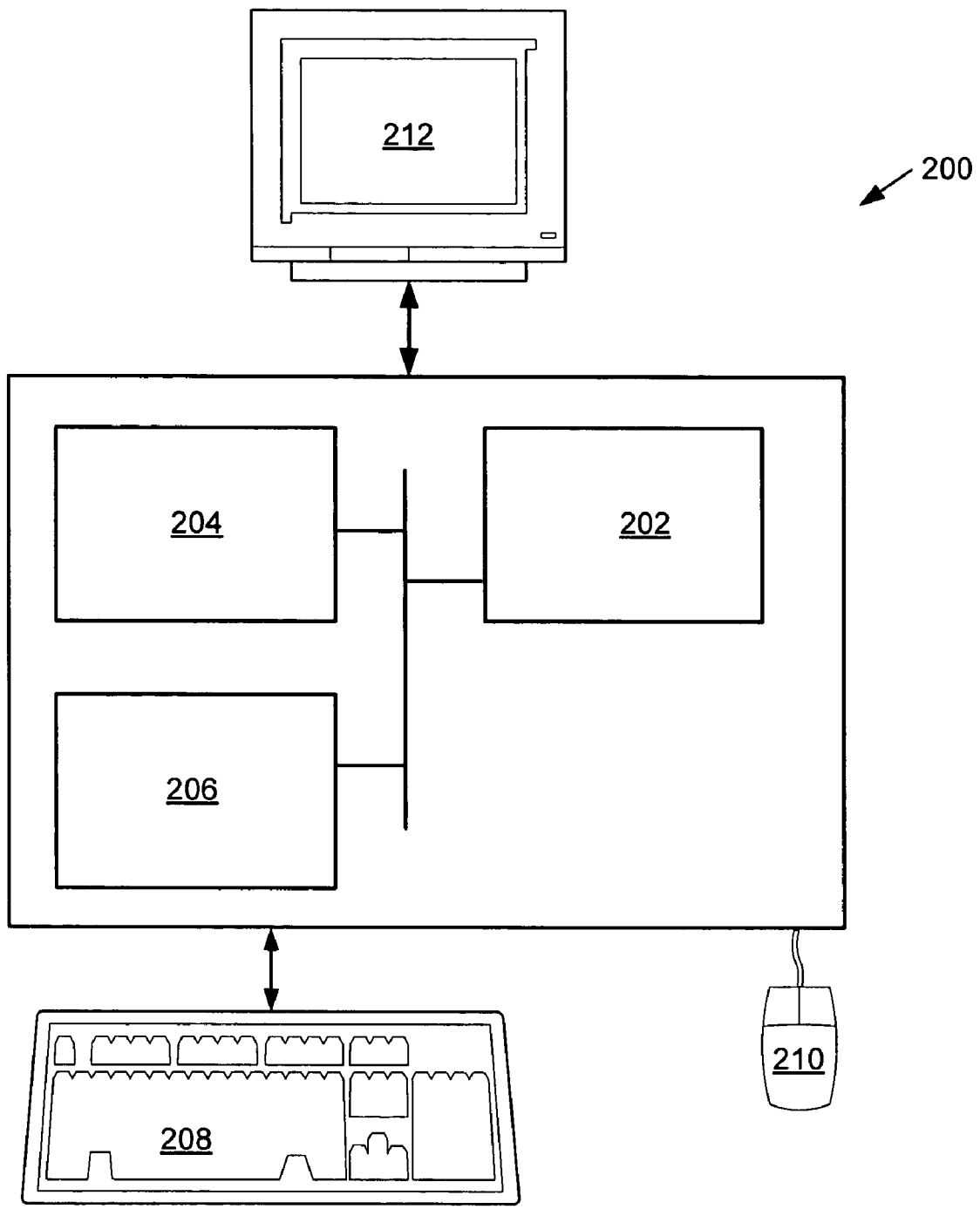
FIG. 7 shows a computer system in accordance with one embodiment of the invention.

An embodiment of the invention may be implemented on virtually any type of computer regardless of the platform being used. For example, as shown in FIG. 7, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network via a network interface connection (not shown). Those skilled in the art will appreciate that these input and output means may take other forms. Further, those skilled in the art will appreciate that one or more elements of the aforementioned computer (200) may be located at a remote location and connected to the other elements over a network. Further, software instructions to perform embodiments of the invention may be stored on a computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing a target system, comprising:
obtaining a characteristics model, wherein the characteristics model comprises a plurality of artifacts, at least one relationship between a first one of the plurality of artifacts and a second one of the plurality of artifacts, and at least one characteristic associated with each of the plurality of artifacts, wherein the characteristics model is stored on a physical computer readable medium;
loading the characteristics model into a meta model, wherein the meta model comprises information describing attributes, characteristics, and relationships of the characteristics model;
obtaining a plurality of characteristics from the target system using a characteristics extractor, wherein each of the plurality of characteristics is associated with the characteristics model, wherein the target system comprises a combination of hardware and software;
storing each of the plurality of characteristics obtained from the target system in a characteristics store;
receiving, by a query engine executing on a processor, at least one query;
verifying the at least one query by traversing the meta model to determine whether each component within the at least one query is defined in the meta model; and
analyzing, in response to the verifying, the target system by issuing the at least one query to the characteristics store to obtain an analysis result, generating the characteristics extractor associated with the characteristics model; and
generating a characteristics store application programming interface (API) associated with the characteristics model, wherein the characteristics extractor uses the characteristics store API to store each of the plurality of characteristics in the characteristics store.

2. The method of claim 1, wherein the meta model is associated with a meta model schema, wherein the meta model schema comprises a plurality of meta attributes, a plurality of meta characteristics, and a plurality of meta relationships, wherein each of the plurality of meta attributes is configured to store a name of one of the plurality of artifacts, wherein each of the plurality of the meta relationships is configured to store a name for the at least one relationship, wherein each of the plurality of meta characteristics is configured to store a name for the at least one characteristics associated with each of the plurality of artifacts.

3. The method of claim 1, wherein each component within the at least one query comprises one selected from the group consisting of a characteristic, an artifact, and a relationship.

4. The method of claim 1, further comprising translating the at least one query from a pattern query language query into a query language supported by the characteristics store, when the at least one query is successfully verified.

5. The method of claim 4, wherein translating the at least one query comprises using a schema implemented in the characteristics store, wherein the schema is associated with the characteristics model.

6. The method of claim 1, wherein the at least one query is defined using a pattern query language.

7. The method of claim 6, wherein the pattern query language includes functionality to search for at least one software pattern in the target system.

8. A system for analyzing a target system, comprising:
a processor;
a memory;
a meta model comprising information about attributes, characteristics, and relationships of a characteristics model, wherein the characteristics model comprises a plurality of artifacts, at least one relationship between a first one of the plurality of artifacts and a second one of the plurality of artifacts, and at least one characteristic associated with each of the plurality of artifacts, wherein the characteristics model is stored on the memory;

the target system comprising a plurality of characteristics, wherein the target system comprises a combination of hardware and software;

at least one characteristics extractor configured to obtain at least one of the plurality of characteristics from the target system, wherein the at least one of the plurality of characteristics is defined in the characteristics model;

a characteristics store configured to store the at least one of the plurality of characteristics obtained from the target system; and a query engine, executing on the processor, configured to:

verify at least one query by traversing the meta model to determine whether each component within the at least one query is defined in the meta model; and analyze, in response to the verifying, the target system by issuing the at least one query to the characteristics store; and obtain an analysis result in response to the at least one query generating the characteristics extractor associated with the characteristics model; and generating a characteristics store application programming interface (API) associated with the characteristics model, wherein the characteristics extractor uses the characteristics store API to store each of the plurality of characteristics in the characteristics store.

9. The system of claim 8, wherein the meta model is associated with a meta model schema, wherein the meta model schema comprises a plurality of meta attributes, a plurality of meta characteristics, and a plurality of meta relationships, wherein each of the plurality of meta attributes is configured to store a name of one the plurality of artifacts, wherein the meta relationship is configured to store a name for the at least one relationship, wherein each of the plurality of meta characteristics are configured to store a name for the at least one characteristics associated with each of the plurality of artifacts.

10. The system of claim 8, wherein extracting the contents of the characteristics model comprises obtaining information about the characteristics model to create a meta model instance of the characteristics model using a meta model schema associated with the meta model.

11. The system of claim 8, wherein each component within the at least one query comprises one selected from the group consisting of a characteristic, an artifact, and a relationship.

12. The system of claim 8, further comprising translating the at least one query from a pattern query language query into a query language supported by the characteristics store, if the at least one query is successfully verified.

13. The system of claim 12, wherein translating the at least one query comprises using a schema implemented in the characteristics store, wherein the schema is associated with the characteristics model.

14. The system of claim 8, wherein the at least one query is defined using a pattern query language and wherein the pattern query language includes functionality to search for at least one pattern in the target system.

15. A computer readable storage medium comprising software instructions for analyzing a target system, the software instructions executable on a computer to:

obtain a characteristics model, wherein the characteristics model comprises a plurality of artifacts, at least one relationship between a first one of the plurality of artifacts and a second one of the plurality of artifacts, and at least one characteristic associated with each of the plurality of artifacts, wherein the characteristics model is stored on a physical computer readable medium;

load the characteristics model into a meta model, wherein the meta model comprises functionality to store information describing attributes, characteristics, and relationships of the characteristics model;

obtain a plurality of characteristics from the target system using a characteristics extractor, wherein each of the plurality of characteristics is associated with the characteristics model, wherein the target system comprises a combination of hardware and software;

store each of the plurality of characteristics obtained from the target system in a characteristics store;

receive, by a query engine executing on a processor, at least one query;

verify the at least one query by traversing the meta model to determine whether each component within the at least one query is defined in the meta model; and analyze, in response to the verifying, the target system by issuing the at least one query to the characteristics store to obtain an analysis result.

16. The computer readable storage medium of claim 15, wherein each component comprises one selected from the group consisting of a characteristic, an artifact, and a relationship.

* * * * *

UNITED STATES PATENT AND TRADEMARK OFFICE
CERTIFICATE OF CORRECTION

PATENT NO. : 7,634,766 B2 Page 1 of 1
APPLICATION NO. : 11/134021
DATED : December 15, 2009
INVENTOR(S) : Syed M. Ali et al.

It is certified that error appears in the above-identified patent and that said Letters Patent is hereby corrected as shown below:

On the Title Page:

Under Item (75) Inventors, line 3, please delete "Santa Clara, CA (US)" and replace with --Fremont, CA (US)--.

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO.       : 7,634,766 B2                          Page 1 of 1
APPLICATION NO.  : 11/134021
DATED            : December 15, 2009
INVENTOR(S)      : Ali et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1167 days.

Signed and Sealed this

Ninth Day of November, 2010

David J. Kappos
*Director of the United States Patent and Trademark Office*